(12) United States Patent
Uchida et al.

(10) Patent No.: US 9,263,190 B2
(45) Date of Patent: Feb. 16, 2016

(54) MULTILAYER CERAMIC CAPACITOR HAVING HIGH MOISTURE RESISTANCE

(71) Applicant: Murata Manufacturing Co., Ltd., Nagaokakyo-shi, Kyoto-fu (JP)

(72) Inventors: Kazuhisa Uchida, Nagaokakyo (JP); Yoshito Saito, Nagaokakyo (JP); Jun Ikeda, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/541,212

(22) Filed: Nov. 14, 2014

(65) Prior Publication Data

US 2015/0187498 A1    Jul. 2, 2015

(30) Foreign Application Priority Data

Dec. 27, 2013    (JP) .................. 2013-272164

(51) Int. Cl.
*H01G 4/12*    (2006.01)
*H01G 4/30*    (2006.01)
*H01G 4/012*    (2006.01)

(52) U.S. Cl.
CPC ............ *H01G 4/1227* (2013.01); *H01G 4/1218* (2013.01); *H01G 4/30* (2013.01); *H01G 4/012* (2013.01)

(58) Field of Classification Search
CPC ....... H01G 4/1227; H01G 4/248; H01G 4/30; H01G 4/12
See application file for complete search history.

(56) References Cited

U.S. PATENT DOCUMENTS

| | | | |
|---|---|---|---|
| 2007/0135295 A1* | 6/2007 | Sasabayashi et al. | 501/138 |
| 2011/0110014 A1* | 5/2011 | Hirata et al. | 361/301.4 |
| 2012/0140376 A1* | 6/2012 | Ishihara et al. | 361/301.4 |
| 2012/0147518 A1* | 6/2012 | Matsuda et al. | 361/301.4 |

FOREIGN PATENT DOCUMENTS

| | | |
|---|---|---|
| JP | 2003-100544 A | 4/2003 |
| JP | 2009249257 A * | 10/2009 |

\* cited by examiner

*Primary Examiner* — David M Sinclair
(74) *Attorney, Agent, or Firm* — Keating & Bennett, LLP (57) ABSTRACT

In a multilayer ceramic capacitor, an inner ceramic layer includes a perovskite-type compound containing Ba and Ti. A region within an electrically effective portion of the inner ceramic layers sandwiched between inner electrodes, which is near an area where inner and outer electrodes connect to each other, is subjected to a mapping analysis using EDS. $((L2-L3)/L1) \times 100 \geq 50$ is satisfied, L1 denotes a total length of ceramic grain boundaries detected from a TEM transmission image, L2 denotes a total length of grain boundaries, detected from a mapping image and the TEM transmission image, where the rare earth element is present, and L3 denotes a total length of portions, detected from a mapping image and the TEM transmission image, in which the grain boundaries where the rare earth element is present and grain boundaries where at least one of Mn, Mg, and Si is present are overlapped.

3 Claims, 4 Drawing Sheets

MULTILAYER CERAMIC CAPACITOR HAVING HIGH MOISTURE RESISTANCE

BACKGROUND OF THE INVENTION

1. Field of the Invention

The present invention relates to a multilayer ceramic capacitor that has high reliability in moisture resistance.

2. Description of the Related Art

Recently, multilayer ceramic capacitors have been used under increasingly severer environments than the past.

Taking into account such a situation, a multilayer ceramic capacitor, disclosed in Japanese Unexamined Patent Application Publication No. 2003-100544, is proposed to satisfy good temperature characteristics and good lifetime characteristics. The disclosed multilayer ceramic capacitor includes a dielectric layer made of a dielectric ceramic composition, inner electrodes sandwiching the dielectric layer, and outer electrodes electrically connected to the inner electrodes. The dielectric ceramic composition is made of two or more types of ceramic particles containing predetermined constituent elements at different concentrations.

However, the multilayer ceramic capacitor disclosed in Japanese Unexamined Patent Application Publication No. 2003-100544 has the drawback that IR (insulation resistance) degrades when a voltage is applied under environments at high humidity and high temperature. In particular, the size of the multilayer ceramic capacitor is getting smaller and the number of the stacked dielectric layers and inner electrodes is getting larger in order to obtain high electrostatic capacitance, IR degradation becomes significant.

SUMMARY OF THE INVENTION

Accordingly, preferred embodiments of the present invention provide a multilayer ceramic capacitor that has high reliability in moisture resistance.

According to a preferred embodiment of the present invention, a multilayer ceramic capacitor includes a ceramic multilayer body in which a plurality of dielectric ceramic layers and a plurality of inner electrodes are alternately stacked, and outer electrodes that are provided on an outer surface of the ceramic multilayer body and that are electrically connected to respective ones of the inner electrodes, wherein the dielectric ceramic layers contain a perovskite-type compound containing Ba and Ti. Furthermore, when a region within an electrically effective portion of the dielectric ceramic layers sandwiched between the inner electrodes, the region being positioned closest to an extension portion of the inner electrode that extends to the outer electrode, is observed with a transmission electron microscope (TEM) and is subjected to a mapping analysis using energy dispersive X-ray spectroscopy (EDS), a relationship $((L2-L3)/L1) \times 100 \geq 50$ is satisfied wherein $L1$ denotes a total length of ceramic grain boundaries, which is calculated using a TEM transmission image, $L2$ denotes a total length of grain boundaries where the rare earth element is present, which are detected from a mapping image, and $L3$ denotes a total length of grain boundaries where the rare earth element and at least one of Mn, Mg, and Si is detected in overlapped relation from a mapping image.

Here, a value expressed by $((L2-L3)/L1) \times 100$, i.e., a value $A$ $(A=((L2-L3)/L1) \times 100)$ indicates a ratio (%) of the total length $L2$ of the grain boundaries where the rare earth element is present (except for the total length $L3$ of portions in which the "grain boundaries where the rare earth element is present" and "grain boundaries where at least one of Mn, Mg, and Si is present" are overlapped) with respect to the total length $L1$ of the ceramic grain boundaries, the ratio being obtained from the TEM transmission image and the mapping image.

Furthermore, the expression "electrically effective portion of the dielectric ceramic layers" indicates a portion of the dielectric ceramic layers in which an electrostatic capacitance of a capacitor is effectively generated.

In the multilayer ceramic capacitor, IR (insulation resistance) degrades when a voltage is applied under environments with high humidity and high temperature. Such a phenomenon is presumably attributable to the fact that moisture having entered the inside of the capacitor is separated into $H^+$ ions and $OH^-$ ions through electrolysis, and those ions drift mainly near an area where the inner electrodes and the outer electrodes connect to each other in the electrically effective portion of the dielectric ceramic layers that are sandwiched between the inner electrodes, thus increasing a leak current.

In various preferred embodiments of the present invention, a first group of the grain boundaries where the rare earth element is detected and the at least one of Mg, Mn and Si is not detected have a higher content percentage of the rare earth element compared to a second group of the grain boundaries where both the rare earth element and at least one of Mg, Mn and Si are detected. In the above relationship, $L2-L3$ represents a total length of the grain boundaries which have the higher content percentage of the rare earth element.

At the grain boundaries having the higher content percentage of the rare earth element, resistance against ion drift is also high, and drift of $H^+$ ions and $OH^-$ ions is significantly reduced or prevented. Thus, degradation of IR (insulation resistance) is prevented at the grain boundaries where the content percentage of the rare earth element is high. Stated in another way, in the multilayer ceramic capacitor, a proportion of the grain boundaries where the rare earth element has a higher content percentage derived from the formula, $((L2-L3)/L1) \times 100$, is as high as 50% or more in the mapping image of the region located within the electrically effective portion of the inner ceramic layers and near an area where the inner electrode and the outer electrode connect to each other. As a result, the multilayer ceramic capacitor having good reliability in moisture resistance is obtained.

With various preferred embodiments of the present invention, multilayer ceramic capacitors having high reliability in moisture resistance are provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 2A, 2B and 2C are TEM transmission images in which results of a mapping analysis using the EDS (energy dispersive X-ray spectroscopy) are marked; specifically.

DETAILED DESCRIPTION OF THE PREFERRED EMBODIMENTS

Figure 1:
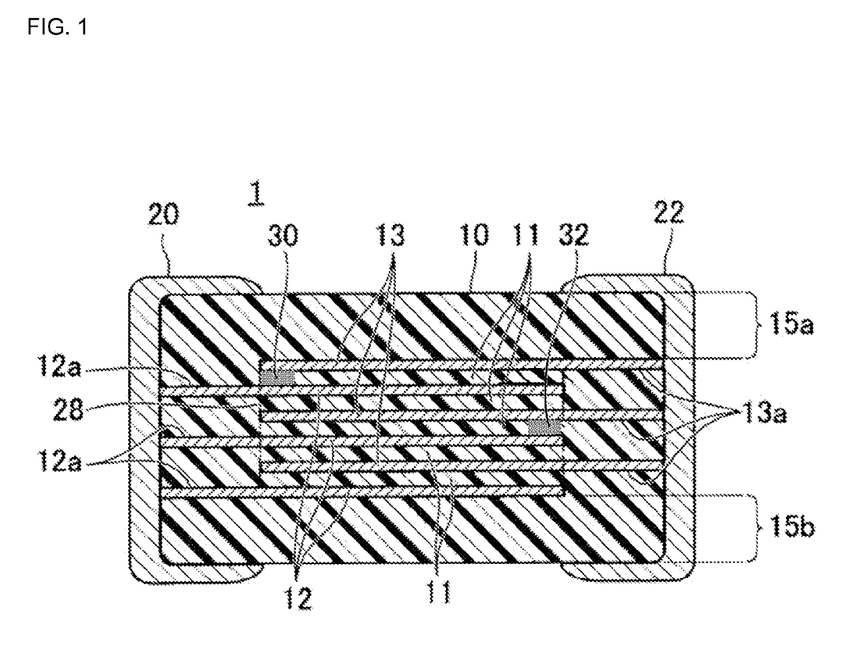
FIG. 1 is a vertical sectional view of a multilayer ceramic capacitor according to a preferred embodiment of the present invention.

FIG. 1 is a vertical sectional view of a multilayer ceramic capacitor 1. The multilayer ceramic capacitor 1 includes a ceramic multilayer body 10, outer electrodes 20 and 22 provided at left and right end portions of the ceramic multilayer body 10.

The ceramic multilayer body 10 preferably a plurality of inner ceramic layers 11, a plurality of inner electrodes 12 and 13 each disposed at an interface between adjacent ones of the inner ceramic layers 11, and by outer ceramic layers 15a and 15b that are disposed on the upper and lower sides of the plural inner ceramic layers 11 in sandwiching relation. In other words, the ceramic multilayer body 10 has a multilayer body structure preferably having a substantially rectangular parallelepiped shape in which the ceramic layers, denoted by 11, 15a and 15b, and the inner electrodes, denoted by 12 and 13, are alternately stacked.

The inner ceramic layers 11 are each made of a dielectric ceramic material that contains, as a main constituent, a perovskite-type compound containing Ba and Ti, e.g., barium titanate. Accessory constituents, such as a Dy compound containing a rare earth element Dy, an Mg compound, and an Mn compound, are preferably further added to the above-mentioned main constituent. The average thickness of the inner ceramic layer 11 is preferably about 0.3 μm to about 10.0 μm, and more preferably about 0.3 μm to about 1.0 μm, for example. Even more preferably, the average thickness of the inner ceramic layer 11 is preferably about 0.3 μm to about 0.5 μm, for example. As the thickness of the inner ceramic layer 11 is smaller, heat applied during firing is more apt to be uniformly conducted through the inner ceramic layer 11 in a moment. Therefore, a distribution of the rare earth element in the inner ceramic layer 11 becomes more uniform, and a multilayer ceramic capacitor with good reliability is obtained in a smaller size.

The outer ceramic layers 15a and 15b disposed on the upper and lower sides are also each made of the same dielectric ceramic material as that of the inner ceramic layers 11. Alternatively, the outer ceramic layers 15a and 15b may be made of a dielectric ceramic material different from that of the inner ceramic layers 11.

The inner electrode 12 and the inner electrode 13 are opposed to each other in the thickness direction with the inner ceramic layer 11 interposed therebetween. An electrostatic capacitance is effectively provided in a portion where the inner electrode 12 and the inner electrode 13 are opposed to each other with the inner ceramic layer 11 interposed therebetween. Stated in another way, an "electrically effective portion of dielectric ceramic layers" indicates a portion 28 of the inner ceramic layers 11 where the inner electrodes 12 and the inner electrodes 13 are opposed to each other (i.e., a portion 28 of the inner ceramic layers 11 surrounded by one-dot-chain lines in FIG. 1).

An extending portion 12a of the inner electrode 12 is led out to a left end surface of the ceramic multilayer body 10 and is electrically connected to the outer electrode 20. An extending portion 13a of the inner electrode 13 is led out to a right end surface of the ceramic multilayer body 10 and is electrically connected to the outer electrode 22.

The inner electrodes 12 and 13 are each preferably made of, e.g., Ni, Cu, Ag, Pd, an Ag—Pd alloy, or Au. The average thickness of the inner electrodes 12 and 13 is preferably about 0.3 μm to about 2.0 μm, and more preferably about 0.3 μm to about 0.55 μm, for example. Even more preferably, the average thickness of the inner electrodes 12 and 13 is about 0.3 μm to about 0.4 μm, for example.

The outer electrodes 20 and 22 are each preferably made of, e.g., Ni, Cu, Ag, Pd, an Ag—Pd alloy, or Au. An Ni plating layer and an Sn plating layer are formed on the surface of each of the outer electrodes 20 and 22.

For the multilayer ceramic capacitor 1 having the above-described structure, a mapping analysis using the known energy dispersive X-ray spectroscopy (EDS) is carried out on a region 30 (e.g., a region denoted by dotted lines in FIG. 1) within the electrically effective portion 28 of the inner ceramic layers 11 sandwiched between the inner electrodes 12 and 13, the region 30 being positioned closest to the extending portion 12a of the inner electrode 12. Alternatively, the mapping analysis using the known energy dispersive X-ray spectroscopy is carried out on a region 32 (e.g., a region denoted by dotted lines in FIG. 1), which is positioned near an area where the inner electrode 13 and the outer electrode 22 are connected to each other, and which is closest to the extending portion 13a of the inner electrode 13.

The reason why the region 30 near an area where the inner electrode 12 and the outer electrode 20 connect to each other (or the region 32 near an area where the inner electrode 13 and the outer electrode 22 connect to each other) is used as a region to be measured by the mapping analysis resides in that intrusion of moisture is more apt to occur in the relevant region.

Furthermore, a relationship $((L2-L3)/L1) \times 100 \geq 50$ preferably is satisfied, wherein L1 denotes a total length of ceramic grain boundaries, which is calculated using a TEM transmission image, L2 denotes a total length of grain boundaries where the rare earth element is present, which are detected from a mapping image, and L3 denotes a total length of portions in which the grain boundaries where the rare earth element is present and grain boundaries where at least one of Mn, Mg, and Si is present are overlapped, the portions being detected from a mapping image.

A first group of the grain boundaries where the rare earth element is detected and the at least one of Mg, Mn and Si is not detected have a higher content percentage of the rare earth element compared to a second group of the grain boundaries where both the rare earth element and at least one of Mg, Mn and Si are detected. In the above relationship, L2−L3 represents a total length of the grain boundaries which have the higher content percentage of the rare earth element.

At the grain boundaries having the higher content percentage of the rare earth element, resistance against ion drift is also high, and drift of $H^+$ ions and $OH^-$ ions is significantly reduced or prevented. Thus, degradation of IR (insulation resistance) is prevented at the grain boundaries where the content percentage of the rare earth element is high.

Stated in another way, in the multilayer ceramic capacitor 1, a proportion of the grain boundaries where the rare earth element has a higher content percentage derived from the formula, $((L2-L3)/L1) \times 100$, is as high as 50% or more in the mapping image of the region 30 located within the electrically effective portion of the inner ceramic layers 11 and near an area where the inner electrode 12 and the outer electrode 20 connect to each other. As a result, the multilayer ceramic capacitor 1 having good reliability in moisture resistance is obtained.

A non-limiting example of a manufacturing method for the multilayer ceramic capacitor 1 will be described below.

First, $BaTiO_3$ is weighed and wet-mixed by using a ball mill to disintegrate aggregates. Then, compounds to be added are weighed relative to 100 mol parts of Ti in $BaTiO_3$ such that about 1.15 mol part of $Dy_2O_3$, about 1.0 mol part of $MgCO_3$, about 0.5 mol part of $MnCO_3$, and about 1.5 mol part of $SiO_2$ are resulted. Moreover, $BaCO_3$ is properly weighed such that a content ratio of Ba to Ti becomes substantially 1.007:1 in $BaTiO_3$ after firing.

Next, $BaTiO_3$ and the added compounds are blended and mixed by using a ball mill with water used as a medium. Thereafter, a dielectric material mixture is obtained from the above-mentioned materials through evaporation and drying.

Next, a polyvinyl butyral-based binder and an organic solvent, e.g., ethanol, are added to the dielectric material mixture and are wet-mixed by using a ball mill, whereby ceramic slurry is obtained. The ceramic slurry is formed, by the Lip technique, into a sheet that has a layer thickness of about 3.0 μm after firing. The formed sheet is used as a ceramic green sheet for an inner layer or a ceramic green sheet for an outer layer.

A conductive paste for the inner electrode, which contains, e.g., Ni, Cu and Pd as main constituents, is coated over the ceramic green sheet for the inner layer by screen printing, whereby the inner electrode 12 or 13 having a predetermined pattern is formed. A film thickness of the inner electrodes 12 and 13 is set such that the inner electrode has a thickness of about 1 μm after firing.

Next, the ceramic green sheet for the outer layer is stacked in a predetermined number such that the outer ceramic layer 15b has a thickness of about 70 μm after firing. On those ceramic green sheets for the outer layer, the ceramic green sheets for the inner layer, including the inner electrodes 12 and 13 formed thereon, are successively stacked in such a way that the inner electrodes 12 and 13 are alternately positioned. On those ceramic green sheets for the inner layer, the ceramic green sheet for the outer layer is stacked in a predetermined number such that the outer ceramic layer 15a has a thickness of about 70 μm after firing. A mother ceramic body is fabricated as described above.

Next, the mother ceramic body is pressed in the stacking direction by a hydrostatic press or the like. Thereafter, the mother ceramic body is cut in units of predetermined product size by a dicing saw, and the ceramic multilayer body 10 in an unfired state is cut out. A gap between a lateral surface of the ceramic multilayer body 10 and the inner electrodes 12 and 13 is about 100 μm in the direction of a width W of the ceramic multilayer body 10. Corners and ridges of the ceramic multilayer body 10 are rounded by barrel polishing, for example.

Next, the ceramic multilayer body 10 in the unfired state is fired. In other words, the ceramic multilayer body 10 is heat-treated at about 270° C. as a maximum temperature in atmospheric air or in a gas stream of $N_2$ (in this preferred embodiment, in a gas stream of $N_2$). Subsequently, the ceramic multilayer body 10 is heat-treated at about 700° C. as a maximum temperature under an atmosphere in a gas stream of $N_2$—$H_2O$—$H_2$ with oxygen partial pressure of about $10^{-10.6}$ MPa. Then, the ceramic multilayer body 10 is fired at about 1300° C. as a maximum temperature under an atmosphere in a gas stream of $N_2$ with oxygen partial pressure of about $10^{-4.6}$ MPa on condition of a predetermined temperature rise rate. In the firing step, the ceramic multilayer body 10 is cooled immediately after reaching about 1300° C. as the maximum temperature. A firing temperature is preferably about 900° C. to 1300° C. As a result of the firing, the ceramic green sheets for the inner layer become the inner ceramic layers 11, and the ceramic green sheets for the outer layer become the outer ceramic layers 15a and 15b.

Next, a conductive paste containing Cu as a main constituent is coated over both end surfaces of the ceramic multilayer body 10 after the firing, and is baked at about 940° C. to form the outer electrodes 20 and 22. Furthermore, a Ni—Sn plating layer is formed on a surface of each of the outer electrodes 20 and 22 by wet plating. The multilayer ceramic capacitor 1 is thus fabricated. Dimensions (including the outer electrodes 20 and 22) of the multilayer ceramic capacitor 1 are given as a length L of about 2.0 mm, a width W of about 1.25 mm, and a height T of about 0.5 mm. The average thickness of the inner ceramic layers 11 interposed between the inner electrodes 12 and 13 is about 3.0 μm, and the number of the inner ceramic layers 11 interposed between them is 100.

In a case where the number of the stacked inner electrodes is preferably, but not particularly limited to, 100 layers or greater, reliability in moisture resistance described later is remarkably improved.

Next, a non-limiting example of a method of measuring the average thickness of the inner electrodes and the average thickness of the dielectric layers is explained.

The prepared multilayer ceramic capacitors (hereinafter, referred to as "test materials") were each inspected in the following manner.

Each of the test materials was covered with a resin so that a plane (hereinafter, referred to as "LT-plane") defined by the longitudinal direction (hereinafter, referred to as "L-direction") and the thickness direction (hereinafter, referred to as "T-direction") was exposed.

The LT-plane of each test material was ground to about half the depth of the test material in the width direction (hereinafter, referred to as "W-direction") with a grinder, and thereby the ground surface, that is, the LT-plane, (hereinafter, referred to as "LT-ground end surface") was exposed. After grinding was completed, the ground surface was processed by ion milling in order to eliminate the rollover of the inner electrodes caused by grinding.

Figure 4:
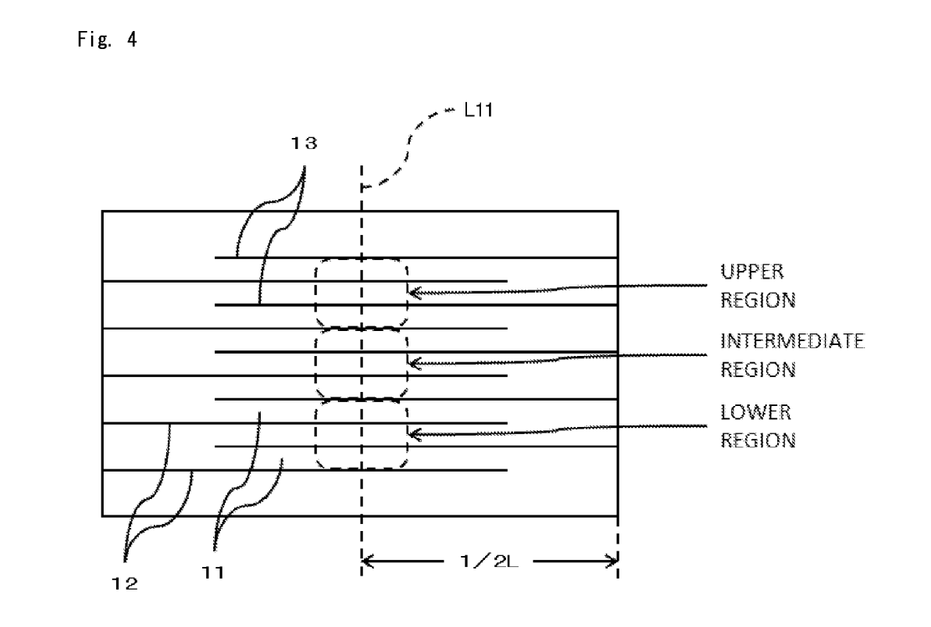
FIG. 4 is an explanatory schematic view of a multilayer ceramic capacitor according to a preferred embodiment of the present invention in order to explain the method of measuring average thicknesses of the dielectric layers and the inner electrodes of the multilayer ceramic capacitor.

The thicknesses of the inner electrodes of each ground test material were measured as follows. As shown in FIG. 4, a straight line L11 was drawn (assumed) at a substantially intermediate position of the LT-ground end surface of each test material in the L-direction so as to intersect the inner electrodes 12, 13 at substantially right angles. Three samples were prepared for each of the test materials, and a portion of each sample in which the inner electrodes 12, 13 were stacked was divided in the T-direction into three substantially equal regions, that is, an upper region, an intermediate region, and a lower region.

In each of the three regions, five inner electrodes were randomly selected from the inner electrodes 12, 13 except for the outermost inner electrodes, the thicknesses of the five inner electrodes were measured at positions at which the inner electrodes 12, 13 intersected the straight line L11 at substantially right angles, and the average of the thicknesses was calculated. Note that, a position at which the thickness of the inner electrode was not able to be measured due to, for example, the absence of the inner electrode was excluded from the measurement. The thicknesses of the inner electrodes were measured using a scanning electron microscope.

The average thickness of the inner electrodes is the average of the thicknesses of the inner electrodes measured at 45 positions (3 samples×3 regions×5 inner electrodes).

In each of the above-described three regions, that is, the upper region, the intermediate region, and the lower region shown in FIG. 4, five inner dielectric layers were randomly selected from the inner dielectric layers 11, the thicknesses of the five inner dielectric layers were measured at positions at which the inner dielectric layers intersected the straight line L11 at substantially right angles, and the average of the thicknesses was calculated. Note that, a position at which the thickness of the dielectric layer was not able to be measured because, for example, two or more dielectric layers were observed as a single dielectric layer due to the absence of the inner electrode was excluded from the measurement. The thicknesses of the inner dielectric layers were measured using a scanning electron microscope.

The average thickness of the inner dielectric layers is the average of the thicknesses of the inner dielectric layers measured at 45 positions (=3 samples×3 regions×5 dielectric layers).

A mapping analysis of the multilayer ceramic capacitor 1 using the energy dispersive X-ray spectroscopy (EDS) will be described below.

After encapsulating the multilayer ceramic capacitor 1 in a resin, a vertical section (LT section) of the multilayer ceramic capacitor 1 is polished until the inner electrodes 12 and 13 are exposed.

Next, for example, the region 30 positioned near the area where the inner electrode 12 and the outer electrode 20 connect to each other within the electrically effective portion 28 of the inner ceramic layers 11 is processed by using a focused ion beam (FIB), whereby a sample for observation with a transmission electron microscope (TEM) is obtained. The sample has a thickness of about 100 nm or less.

The sample is observed with a scanning transmission electron microscope (JEM-2200FS/JEM-2300T) including a Schottky-type FE electron gun, and a mapping analysis is performed using the energy dispersive X-ray spectroscopy. As a result, a transmission electron microscope (TEM) image and a mapping image are obtained. A field of view of each image is set such that a range spanning 1.3 times the average thickness of the inner ceramic layer 11 can be observed in a direction perpendicular to the stacking direction, and such that the entirety of the inner ceramic layer 11 in the thickness direction thereof can be observed in the stacking direction.

Furthermore, in this preferred embodiment, the following conditions are preferably set to detect a distribution state of a trace added element with higher accuracy.

(a) An observation time is 10 hours.
(b) An electron probe diameter is about 2 nm.

It is to be noted that sensitivity of the energy dispersive X-ray spectroscopy is about 0.1 atm %, and that an element is regarded as being not detected when the detection result is less than 0.5 atm %, for example.

Next, from the TEM transmission image and the mapping image, the total length L1 of the ceramic grain boundaries, the total length L2 of the grain boundaries where the rare earth element is present, and the total length L3 of the portions in which the "grain boundaries where the rare earth element is present" and the "grain boundaries where at least one of Mn, Mg, and Si is present" are overlapped, are calculated by using image analysis software such as, for example, a conventional software program referred to as "A-zou-kun Version 2.20" produced by Asahi Kasei Engineering Corp. (See, for example, www.asahi-kasei.co.jp/aec/business/sensing/product/azokun.html). Calculation procedures are as follows.

Figure 2A:
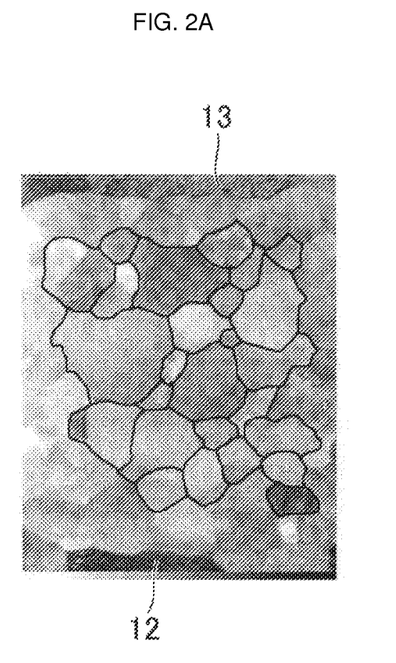
FIG. 2A is a TEM transmission image marking ceramic grain boundaries.

(a) First, the ceramic grain boundaries (i.e., grain boundaries of ceramic particles that are entirely located within the field of view of the TEM transmission image, not including grain boundaries that are in contact with the inner electrodes 12 and 13) are detected from the TEM transmission image. Then, as illustrated in FIG. 2A, the detected ceramic grain boundaries are marked with paint (as denoted by black lines in FIG. 2A), and the total length L1 of the ceramic grain boundaries is measured and calculated by using the image analysis software, such as the conventional software mentioned above.

Figure 2B:
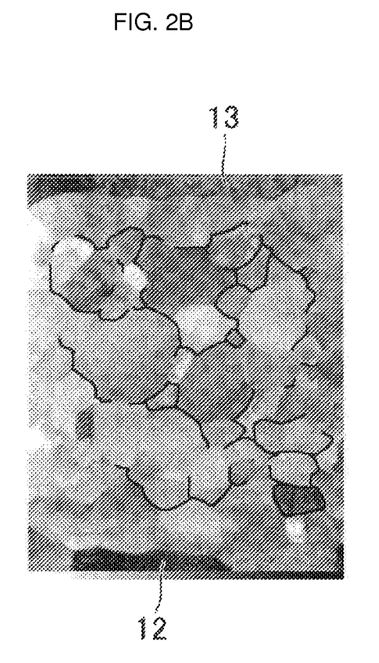
FIG. 2B is a TEM transmission image marking grain boundaries where a rare earth element is present.

(b) Next, the grain boundaries where the rare earth element is present are detected from the mapping image and the TEM transmission image. Then, as illustrated in FIG. 2B, the detected grain boundaries where the rare earth element is present are marked with paint (as denoted by black lines in FIG. 2B), and the total length L2 of the grain boundaries where the rare earth element is present is measured and calculated by using the image analysis software, such as the conventional software mentioned above.

Figure 2C:
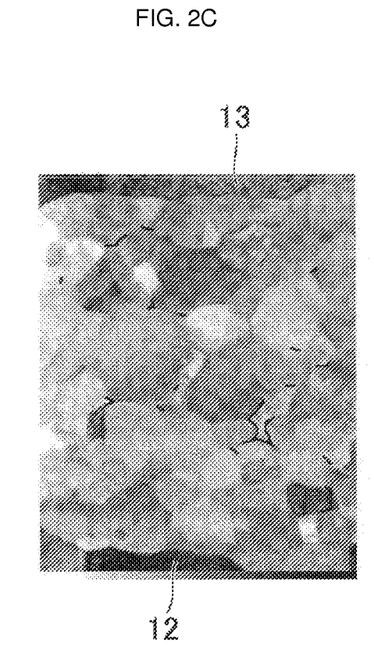
FIG. 2C is a TEM transmission image marking portions in which the grain boundaries where the rare earth element is present and grain boundaries where at least one of Mn, Mg, and Si is present are overlapped.

(c) Next, the portions in which the "grain boundaries where the rare earth element is present" and the "grain boundaries where at least one of Mn, Mg, and Si is present" are overlapped are detected from the mapping image and the TEM transmission image. Then, as illustrated in FIG. 2C, the detected portions are marked with paint (as denoted by black lines in FIG. 2C), and the total length L3 of those portions is measured and calculated by using the image analysis software, such as the conventional software mentioned above.

(d) Next, a proportion of the grain boundaries which have a higher content percentage of the rare earth element is calculated from the total lengths L1, L2 and L3 obtained in above steps (a) to (c), as well as a value A expressed by the following formula:

$$A = ((L2-L3)/L1) \times 100$$

As described above, the mapping analysis is performed on the distribution state of the rare earth element in the TEM transmission image of the region 30 positioned near the area where the inner electrode 12 and the outer electrode 20 connect to each other in the multilayer ceramic capacitor 1.

EXAMPLES

1. First Example

As samples of the FIRST EXAMPLE (each in the form of the multilayer ceramic capacitor 1 using Dy as the rare earth element), eight types of samples (i.e., samples No. 1 to No. 8, see Table 1 given later) were fabricated by the above-described manufacturing method.

In the step of firing the ceramic multilayer body 10 in the unfired state, the temperature rise rate under the atmosphere in the gas stream of $N_2$ with the oxygen partial pressure of $10^{-4.6}$ MPa was set to 1° C./sec to 100° C./sec.

The fabricated multilayer ceramic capacitor 1 was evaluated for reliability in moisture resistance by leaving each sample to stand for 144 hours under environments with the temperature of 134.7° C., the relative humidity of 95% RH, the applied voltage of 10 V, and the gauge pressure of 0.13 MPa. The number of samples evaluated was set to 100 for each condition of the temperature rise rate.

A moisture-resistance rejection rate was defined as a rate of the number of samples, which had caused degradation of the IR, relative to the number of samples evaluated. Here, the sample having caused "degradation of the IR" implies the sample in which an IR value has reduced by 0.5 or more from an initial value in terms of Log(IR value).

Rejection rate for reliability in moisture resistance=
(number of samples having caused degradation of IR/number of samples evaluated)×100(%)

Of the samples each fabricated as the multilayer ceramic capacitor 1, three samples per type were analyzed with the mapping analysis using the energy dispersive X-ray spectroscopy.

More specifically, the analysis was carried out by observing two positions per sample, i.e., a position near a center of the multilayer ceramic capacitor 1 in the direction of the height T and a position near the outer ceramic layer 15a (or 15b) at a vertical section (LT section) of the multilayer ceramic capacitor 1 by using the scanning transmission electron microscope (JEM-2200FS/JEM-2300T) and the EDS (energy dispersive X-ray spectroscopy). Thus, a TEM transmission image and a mapping image were obtained from each sample.

From the TEM transmission image and the mapping image, the total lengths L1, L2 and L3 were measured and calculated by using the image analysis software, such as the conventional software mentioned above. Furthermore, the proportion of the grain boundaries having a higher content percentage of the rare earth element Dy was calculated from the total lengths L1, L2 and L3 and the above-mentioned relationship (1). Table 1 lists an average value of the proportions resulting from performing the measurement at six positions in total.

Figure 3:
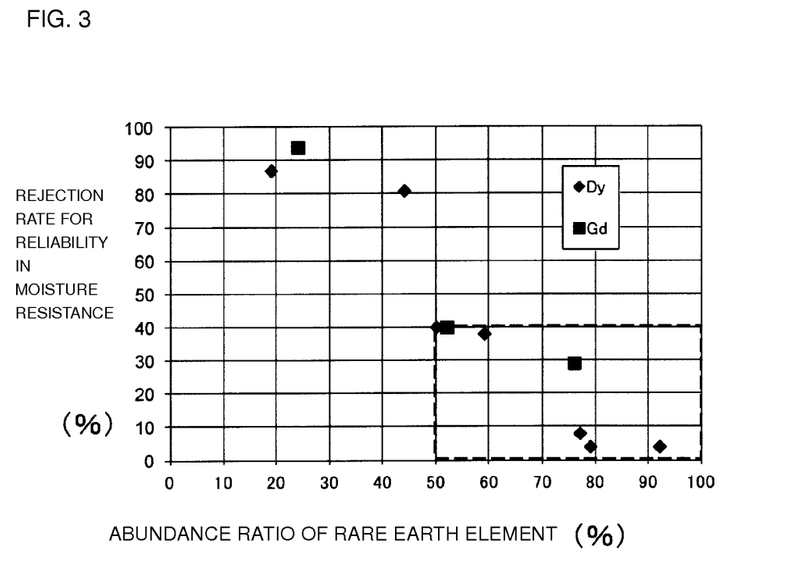
FIG. 3 is a graph depicting a relationship between a content percentage of the rare earth element and a rejection rate for reliability in moisture resistance.

Table 1 lists the evaluation results of the samples each in the form of the multilayer ceramic capacitor 1 using Dy as the rare earth element. FIG. 3 depicts a relationship between a content percentage of the rare earth element Dy and a rejection rate for reliability in moisture resistance.

TABLE 1

| Sample No. | Temperature Rise Rate [° C./sec] | Rejection Rate [%] | Content Percentage of Rare Earth Element Dy [%] |
|---|---|---|---|
| 1 | 1 | 87 | 19 |
| 2 | 3 | 81 | 44 |
| 3 | 6 | 40 | 50 |
| 4 | 10 | 38 | 59 |
| 5 | 30 | 8 | 77 |
| 6 | 50 | 4 | 79 |
| 7 | 80 | 4 | 79 |
| 8 | 100 | 4 | 92 |

From Table 1, it was confirmed that, in the multilayer ceramic capacitor 1, as the content percentage of the rare earth element Dy was higher in the region 30 (or 32) positioned near the area where the inner electrode 12 (or 13) and the outer electrode 20 (or 22) connect to each other within the electrically effective portion 28 of the inner ceramic layers 11, the rejection rate for the reliability in moisture resistance was smaller.

It was further confirmed that the above-mentioned value A was required to be kept at about 50% or more in order to realize the capacitor with high reliability in moisture resistance (i.e., to hold the rejection rate for the reliability in moisture resistance at about 40% or less).

2. Second Example

As samples of the SECOND EXAMPLE (each in the form of the multilayer ceramic capacitor 1 using Gd as the rare earth element), three types of samples (i.e., samples No. 9 to No. 11, see Table 2 given later) were fabricated by the above-described manufacturing method.

The rare earth element Gd was added, in the step of preparing the dielectric material mixture, to $BaTiO_3$ by using $Gd_2O_3$ instead of $Dy_2O_3$ as an additive.

In the step of firing the ceramic multilayer body 10 in the unfired state, the temperature rise rate under the atmosphere in the gas stream of $N_2$ with the oxygen partial pressure of $10^{-4.6}$ MPa was set to 1° C./sec to 100° C./sec.

The fabricated multilayer ceramic capacitor 1 was evaluated for reliability in moisture resistance by leaving each sample to stand for 144 hours under environments with the temperature of 134.7° C., the relative humidity of 95% RH, the applied voltage of 10 V, and the gauge pressure of 0.13 MPa. The number of samples evaluated was set to 100 for each condition of the temperature rise rate.

Of the samples each fabricated as the multilayer ceramic capacitor 1, three samples per type were analyzed by the mapping analysis using the energy dispersive X-ray spectroscopy in a similar manner to that in the FIRST EXAMPLE described above.

Thus, from the TEM transmission image and the mapping image, the total lengths L1, L2 and L3 were measured and calculated by using the image analysis software, such as the conventional software program described above. Furthermore, the proportion of the grain boundaries having a higher content percentage of the rare earth element Gd was calculated from the total lengths L1, L2 and L3, as well as the above-mentioned value A.

Table 2 lists the evaluation results of the samples each in the form of the multilayer ceramic capacitor 1 using Gd as the rare earth element. FIG. 3 depicts a relationship between a content percentage of the rare earth element Gd and a rejection rate for reliability in moisture resistance.

TABLE 2

| Sample No. | Temperature Rise Rate [° C./sec] | Rejection Rate [%] | Content Percentage of Rare Earth Element Gd [%] |
|---|---|---|---|
| 9 | 1 | 94 | 24 |
| 10 | 80 | 40 | 52 |
| 11 | 100 | 29 | 76 |

From Table 2, it was confirmed that, in the multilayer ceramic capacitor 1, as the content percentage of the rare earth element Gd was higher in the region 30 (or 32) positioned near the area where the inner electrode 12 (or 13) and the outer electrode 20 (or 22) connect to each other within the electrically effective portion 28 of the inner ceramic layers 11, the rejection rate for the reliability in moisture resistance was smaller.

It was further confirmed that the above-mentioned value A was required to be kept at about 50% or more in order to realize the capacitor with high reliability in moisture resistance (i.e., to hold the rejection rate for the reliability in moisture resistance at about 40% or less).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic capacitor comprising:
   a ceramic multilayer body including a plurality of dielectric ceramic layers and a plurality of inner electrodes alternately stacked; and
   outer electrodes provided on an outer surface of the ceramic multilayer body and electrically connected to the inner electrodes; wherein the dielectric ceramic layers include a perovskite-type compound containing Ba and Ti; and when a region within an electrically effective portion of the dielectric ceramic layers sandwiched between the inner electrodes, the region being positioned near an area where the inner electrode and the outer electrode connect to each other, is observed with a transmission electron microscope (TEM) and is subjected to a mapping analysis using energy dispersive X-ray spectroscopy (EDS);

a relationship $((L2-L3)/L1) \times 100 \geq 50$ is satisfied, where $L1$ denotes a total length of ceramic grain boundaries, which are detected from a TEM transmission image obtained with the TEM observation, $L2$ denotes a total length of grain boundaries where the rare earth element is present, which are detected from a mapping image obtained with the mapping analysis and the TEM transmission image, and $L3$ denotes a total length of portions in which the grain boundaries where the rare earth element is present and grain boundaries where at least one of Mn, Mg, and Si is present are overlapped, the portions being detected from a mapping image obtained with the mapping analysis and the TEM transmission image; and a total number of the stacked inner electrodes is 100 layers or greater.

2. The multilayer ceramic capacitor according to claim 1, wherein an average thickness of the dielectric ceramic layers is about 0.3 μm to about 1.0 μm.

3. A multilayer ceramic capacitor comprising:

a ceramic multilayer body including a plurality of dielectric ceramic layers and a plurality of inner electrodes alternately stacked; and outer electrodes provided on an outer surface of the ceramic multilayer body and electrically connected to the inner electrodes; wherein the dielectric ceramic layers include a perovskite-type compound containing Ba and Ti; and when a region within an electrically effective portion of the dielectric ceramic layers sandwiched between the inner electrodes, the region being positioned near an area where the inner electrode and the outer electrode connect to each other, is observed with a transmission electron microscope (TEM) and is subjected to a mapping analysis using energy dispersive X-ray spectroscopy (EDS);

a relationship $((L2-L3)/L1) \times 100 \geq 77$ is satisfied, where $L1$ denotes a total length of ceramic grain boundaries, which are detected from a TEM transmission image obtained with the TEM observation, $L2$ denotes a total length of grain boundaries where the rare earth element is present, which are detected from a mapping image obtained with the mapping analysis and the TEM transmission image, and $L3$ denotes a total length of portions in which the grain boundaries where the rare earth element is present and grain boundaries where at least one of Mn, Mg, and Si is present are overlapped, the portions being detected from a mapping image obtained with the mapping analysis and the TEM transmission image; and a total number of the stacked inner electrodes is 100 layers or greater; and an average thickness of the dielectric ceramic layers is about 0.3 μm to about 1.0 μm.

* * * * *